(12) United States Patent
Dahlberg

(10) Patent No.: US 9,830,569 B2
(45) Date of Patent: Nov. 28, 2017

(54) SECURITY ASSESSMENT USING SERVICE PROVIDER DIGITAL ASSET INFORMATION

(71) Applicant: BitSight Technologies, Inc., Cambridge, MA (US)

(72) Inventor: Daniel Dahlberg, Cambridge, MA (US)

(73) Assignee: BitSight Technologies, Inc., Cambridge, MA (US)

( * ) Notice: Subject to any disclaimer, the term of this patent is extended or adjusted under 35 U.S.C. 154(b) by 4 days.

(21) Appl. No.: 15/142,677

(22) Filed: Apr. 29, 2016

(65) Prior Publication Data

US 2016/0239772 A1 Aug. 18, 2016

Related U.S. Application Data

(63) Continuation-in-part of application No. 13/240,572, filed on Sep. 22, 2011, and a continuation-in-part of application No. 14/944,484, filed on Nov. 18, 2015, which is a continuation of application No. 13/240,572, filed on Sep. 22, 2011.

(60) Provisional application No. 61/492,287, filed on Jun. 1, 2011, provisional application No. 61/386,156, filed on Sep. 24, 2010.

(51) Int. Cl.
| | |
|---|---|
| *G06F 21/00* | (2013.01) |
| *H04L 29/06* | (2006.01) |
| *G06Q 10/06* | (2012.01) |
| *G06F 17/30* | (2006.01) |

(52) U.S. Cl.
CPC ... *G06Q 10/0635* (2013.01); *G06F 17/30345* (2013.01); *H04L 63/1425* (2013.01)

(58) Field of Classification Search
CPC .......... G06Q 10/0635; G06F 17/30345; H04L 63/1425
See application file for complete search history.

(56) References Cited

U.S. PATENT DOCUMENTS

| | | |
|---|---|---|
| 5,867,799 A | 2/1999 | Lang |
| 6,016,475 A | 1/2000 | Miller |
| 6,792,401 B1 * | 9/2004 | Nigro ................... G02C 13/003 703/6 |
| 7,100,195 B1 | 8/2006 | Underwood |
| 7,194,769 B2 | 3/2007 | Lippmann et al. |
| 7,290,275 B2 | 10/2007 | Baudoin et al. |
| 7,748,038 B2 | 6/2010 | Olivier |
| 7,971,252 B2 | 6/2011 | Lippmann et al. |
| 8,429,630 B2 | 4/2013 | Nickolov et al. |

(Continued)

OTHER PUBLICATIONS

Edmonds, Robert, "ISC Passive DNS Architecture", Internet Systems Consortium, Inc., Mar. 2012 (18 pages).

(Continued)

*Primary Examiner* — Lisa Lewis
(74) *Attorney, Agent, or Firm* — Goodwin Procter LLP

(57) ABSTRACT

Among other things, customer account data is received from a service provider. The customer account data is representative of relationships that exist at successive times between digital assets provided by the service provider and respective entities to whom the digital assets are provided by the service provider. The received data is used to update a database to represent mappings of digital assets to respective entities to whom the digital assets are provided at one of the successive times, changes in the mappings between successive times, or both.

28 Claims, 3 Drawing Sheets

(56) References Cited

U.S. PATENT DOCUMENTS

| | | | |
|---|---|---|---|
| 8,504,556 B1* | 8/2013 | Rice | G06F 17/3056 707/713 |
| 2001/0044798 A1* | 11/2001 | Nagral | G06F 9/4443 |
| 2002/0083077 A1* | 6/2002 | Vardi | G06F 17/30554 |
| 2003/0050862 A1* | 3/2003 | Bleicken | G06Q 30/06 705/26.81 |
| 2003/0123424 A1* | 7/2003 | Jung | H04L 67/1023 370/338 |
| 2004/0010709 A1 | 1/2004 | Baudoin et al. | |
| 2004/0024859 A1* | 2/2004 | Bloch | H04L 43/0876 709/223 |
| 2004/0133561 A1* | 7/2004 | Burke | G06Q 10/107 |
| 2004/0193918 A1 | 9/2004 | Green et al. | |
| 2004/0199791 A1 | 10/2004 | Poletto et al. | |
| 2004/0199792 A1 | 10/2004 | Tan et al. | |
| 2004/0221296 A1 | 11/2004 | Ogielski | |
| 2004/0250122 A1 | 12/2004 | Newton | |
| 2004/0250134 A1 | 12/2004 | Kohler et al. | |
| 2005/0071450 A1* | 3/2005 | Allen | H04L 12/2602 709/223 |
| 2005/0080720 A1 | 4/2005 | Betz | |
| 2005/0108415 A1 | 5/2005 | Turk et al. | |
| 2005/0131830 A1* | 6/2005 | Juarez | G06Q 30/02 705/51 |
| 2005/0138413 A1 | 6/2005 | Lippmann et al. | |
| 2006/0173992 A1 | 8/2006 | Weber et al. | |
| 2006/0212925 A1 | 9/2006 | Shull et al. | |
| 2007/0143851 A1 | 6/2007 | Nicodemus et al. | |
| 2007/0282730 A1 | 12/2007 | Carpenter et al. | |
| 2008/0047018 A1 | 2/2008 | Baudoin et al. | |
| 2008/0140495 A1 | 6/2008 | Bhamidipaty et al. | |
| 2008/0162931 A1* | 7/2008 | Lord | H04L 9/08 713/165 |
| 2008/0209565 A2 | 8/2008 | Baudoin et al. | |
| 2009/0044272 A1* | 2/2009 | Jarrett | G06F 21/568 726/23 |
| 2009/0193054 A1* | 7/2009 | Karimisetty | G06F 17/30368 |
| 2009/0265787 A9 | 10/2009 | Baudoin et al. | |
| 2009/0293128 A1 | 11/2009 | Lippmann et al. | |
| 2010/0262444 A1* | 10/2010 | Atwal | G06Q 40/08 705/38 |
| 2011/0185403 A1* | 7/2011 | Dolan | G06F 21/31 726/6 |
| 2012/0158725 A1 | 6/2012 | Molloy et al. | |
| 2012/0166458 A1 | 6/2012 | Laudanski et al. | |
| 2013/0060351 A1* | 3/2013 | Imming | G06Q 10/08 700/13 |
| 2014/0108474 A1 | 4/2014 | David et al. | |
| 2014/0204803 A1 | 7/2014 | Nguyen | |
| 2014/0288996 A1* | 9/2014 | Rence | G06Q 10/0635 705/7.28 |
| 2015/0074579 A1 | 3/2015 | Gladstone et al. | |
| 2015/0310188 A1 | 10/2015 | Ford et al. | |

OTHER PUBLICATIONS

SBIR Phase I: Enterprise Cyber Security Scoring, CyberAnalytix, LLC, http://www.nsf.gov/awardsearch/showAward.do?AwardNumber=1013603, Apr. 28, 2010.

"Twenty Critical Controls for Effective Cyber Defense: Consensus Audit," Version 2.3, Nov. 13, 2009, retrieved on Apr. 9, 2010 from http://www.sans.org/critical-security-controls/print.php.

"An Executive View of IT Governance," IT Governance Institute, 2009, 32 pages.

Lippmann, R. P., et al., "An Annotated Review of Papers on Attack Graphs," Project Report IA-1, Lincoln Laboratory, Massachusetts Institute of Technology, Mar. 31, 2005, 39 pages.

Artz, Michael Lyle, "NetSPA: A Network Security Planning Architecture," Massachusetts Institute of Technology, May 24, 2002, 97 pages.

Nye, John, "Avoiding Audit Overlap," Moody's Risk Services, Presentation, Source Boston, Mar. 14, 2008, 19 pages.

"Agreed Upon Procedures," Version 4.0, BITS, the Financial Institution Shared Assessments Program, Assessment Guide, Sep. 2008, 56 pages.

"Master Security Criteria," Version 3.0, BITS Financial Services Security Laboratory, Oct. 2001, 47 pages.

The Financial Institution Shared Assessments Program, Industry Positioning and Mapping Document, BITS, Oct. 2007, 44 pages.

Browne, Niall, et al., "Shared Assessments Program AUP and SAS70 Frequently Asked Questions," BITS, 4 pages.

"Shared Assessments: Getting Started," BITS, 2008, 4 pages.

Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.

Buckshaw, Donald L., "Use of Decision Support Techniques for Information System Risk Management," submitted for publication in Wiley's Encyclopedia of Quantitative Risk Assessment in Jan. 2007, 11 pages.

Buehler, Kevin S., et al., "Running with risk," the McKinsey Quarterly, No. 4, 2003, pp. 40-49.

Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.

The CIS Security Metrics v1.0.0, the Center for Internet Security, May 11, 2009, 90 pages.

Method Documentation, CNSS Risk Assessment Tool Version 1.1, Mar. 31, 2009, 24 pages.

Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.

"Assuring a Trusted and Resilient Information and Communications Infrastructure," Cyberspace Policy Review, May 2009, 76 pages.

Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.

Dillon-Merrill, PhD., Robin L, et al., "Logic Trees: Fault, Success, Attack, Event, Probability, and Decision Trees," Wiley Handbook of Science and Technology for Homeland Security, 13 pages.

Dun & Bradstreet, The DUNSRight Quality Process: Power Behind Quality Information, 24 pages.

The Dun & Bradstreet Corp. Stock Report, Standard & Poor's, Jun. 6, 2009, 8 pages.

Equifax Inc. Stock Report, Standard & Poor's, Jun. 6, 2009, 8 pages.

The Fair Credit Reporting Act (FCRA) of the Federal Trade Commission (FTC), Jul. 30, 2004, 86 pages.

Report to the Congress on Credit Scoring and Its Effects on the Availability and Affordability of Credit, Board of Governors of the Federal Reserve System, Aug. 2007, 304 pages.

Stone-Gross, Brett, et al., "Fire: Finding Rogue Networks," 10 pages.

Ingols, Kyle, et al., "Modeling Modern Network Attacks and Countermeasures Using Attack Graphs," MIT Lincoln Laboratory, 16 pages.

Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.

Ingols, Kyle, et al., "Practical Experiences Using SCAP to Aggregate CND Data," MIT Lincoln Library, Presentation to NIST SCAP Conference, Sep. 24, 2008, 59 pages.

Johnson, Eric, et al., "Information Risk and the Evolution of the Security Rating Industry," Mar. 24, 2009, 27 pages.

Lippmann, R. P., et al., "Evaluating and Strengthening Enterprise Network Security Using Attack Graphs," Project Report IA-2, MIT Lincoln Laboratory, Oct. 5, 2005, 96 pages.

"Assessing Risk in Turbulent Times," a Workshop for Information Security Executives, Glassmeyter/McNamee Center for Digital Strategies, Tuck School of Business at Dartmouth, Institute for Information Infrastructure Protection, 2009, 17 pages.

Lippmann, Richard, et al., "Validating and Restoring Defense in Depth Using Attack Graphs," MIT Lincoln Laboratory, 10 pages.

(56) References Cited

OTHER PUBLICATIONS

"Plugging the Right Holes," Lab Notes, MIT Lincoln Library, Posted Jul. 2008, retrieved Sep. 14, 2010 from http://www.11.miLedufpublicationsflabnotesfpluggingtherightho!. . . , 2 pages.

Rare Events, Oct. 2009, Jason, the MITRE Corporation, Oct. 2009, 104 pages.

Lippmann, Rich, et al., NetSPA: a Network Security Planning Architecture, MIT Lincoln Laboratory, 11 pages.

Proposal and Award Policies and Procedures Guide, Part I—Proposal Preparation & Submission Guidelines GPG, the National Science Foundation, Feb. 2009, 68 pages.

Paxson, Vern, "How the Pursuit of Truth Led Me to Selling Viagra," EECS Department, University of California, International Computer Science Institute, Lawrence Berkeley National Laboratory, Aug. 13, 2009, 68 pages.

"Report on Controls Placed in Operation and Test of Operating Effectiveness," EasCorp, Jan. 1, through Dec. 31, 2008, prepared by Crowe Horwath, 58 pages.

Taleb, Nassim N., et al., "The Six Mistakes Executives Make in Risk Management," Harvard Business Review, Oct. 2009, 5 pages.

2009 Data Breach Investigations Report, study conducted by Verizon Business Risk Team, 52 pages.

Williams, Leevar, et al., "GARNET: A Graphical Attack Graph and Reachability Network Evaluation Tool," MIT Lincoln Library, VizSEC 2009, pp. 44-59.

Williams, Leevar, et al., "An Interactive Attack Graph Cascade and Reachability Display," MIT Lincoln Laboratory, 17 pages.

U.S. Appl. No. 14/021,585 as of Apr. 29, 2016.

U.S. Appl. No. 13/240,572 as of Apr. 29, 2016.

U.S. Appl. No. 14/944,484 as of Apr. 29, 2016.

Computer Network Graph-Bees, http://bioteams.com/2007/04/30/visualizing_complex_networks.html, date accessed Sep. 28, 2016.

Computer Network Graph-Univ. of Michigan, http://people.cst.cmich.edu/liao1q/research.shtml, date accessed Sep. 28, 2016.

Hacking Exposed 6, S. McClure et al., copyright 2009, 37 pages.

MaxMind, https://www.maxmind.com/en/about-maxmind, https://www.maxmind.com/en/geoip2-isp-database, date accessed Sep. 28, 20116, 3 pages.

Netcraft, www.netcraft.com, date accessed Sep. 28, 2016, 2 pages.

NetScanTools Pro, http://www.netscantools.com/nstpromain.html, date accessed Sep. 28, 2016, 2 pages.

Network Security Assessment, C. McNab, copyright 2004, 13 pages.

RFC 781, https://tools.ietf.org/html/rfc781, date accessed Sep. 28, 2016, 3 pages.

RFC 950, https://tools.ietf.org/html/rfc950, date accessed Sep. 28, 2016, 19 pages.

RFC 954, https://tools.ietf.org/html/rfc954, date accessed Sep. 28, 2016, 5 pages.

RFC 1834, https://tools.ietf.org/html/rfc1834, date accessed Sep. 28, 2016, 7 pages.

SamSpade Network Inquiry Utility, https://www.sans.org/reading-room/whitepapers/tools/sam-spade-934, date accessed Sep. 28, 2016, 19 pages.

Security Warrior, Cyrus Peikari, Anton, Chapter 8: Reconnaissance, 6 pages.

Snort Intrusion Monitoring System, http://archive.oreilly.com/pub/h/1393, date accessed Sep. 28, 2016, 3 pages.

Wikipedia, https://en.wikipedia.org/wiki/Crowdsourcing, date accessed Sep. 28, 2016.

* cited by examiner

US 9,830,569 B2

SECURITY ASSESSMENT USING SERVICE PROVIDER DIGITAL ASSET INFORMATION

BACKGROUND

This application is a continuation-in-part of U.S. patent application Ser. No. 13/240,572, filed on Sep. 22, 2011, and Ser. No. 14/944,484, filed on Nov. 18, 2015, which is a continuation of U.S. patent application Ser. No. 13/240,572, filed on Sep. 22, 2011, and both of which are entitled to the benefit of the filing date of U.S. provisional patent application Ser. 61/386,156, filed on Sep. 24, 2010, and Ser. 61/492,287, filed on Jun. 1, 2011. This description also relates to U.S. Ser. No. 14/021,585, filed Feb. 16, 2016; Ser. No. 15/089,375, filed on Apr. 1, 2016; and Ser. No. 15/089,207, filed on Apr. 1, 2016. All of the applications identified in this paragraph are incorporated here by reference in their entirety.

This description relates to security assessment using service provider digital asset information.

An Internet-related service provider, for example, typically maintains, with respect to each of its customers, account information about the customer and its Internet-related service, including the kind of contract that applies to the customer, an account identifier, contact information, email addresses, and identification of digital assets (such as IP addresses, domain names, phone numbers, International Mobile Station Equipment Identities (IMEI), and International Mobile Subscriber Identities (IMSI)) that are assigned to the customer, among others.

Information about the relationships between digital assets and entities that own, control, or manage such assets can be useful in tracking, assessing, rating, and reporting of cyber security risks associated with the entities.

SUMMARY

In general, in an aspect, customer account data is received from a service provider. The customer account data is representative of relationships that exist at successive times between digital assets provided by the service provider and respective entities to whom the digital assets are provided by the service provider. The received data is used to update a database to represent mappings of digital assets to respective entities to whom the digital assets are provided at one of the successive times, changes in the mappings between successive times, or both.

Implementations may include one or a combination of any two or more of the following features. The digital assets provided by the service provider include digital asset identifiers of digital assets provided by the service provider as of each of the successive times. The digital asset identifiers include IP addresses or domain names or both or other digital asset identifiers. The customer account data is expressed in a predetermined format and the account data in the predetermined format is preprocessed to generate data in a common format for use in the updating of the database. The relationships include vendor-customer relationships between the service provider and the entities with respect to the digital assets. A party other than the service provider or any of the entities receives the data and updates the database. The service provider internally receives the data and updates the database. The account data includes identifiers of the entities. The account data includes information about the digital assets. The account data includes a dataset of a database of the service provider.

The preprocessing includes matching an entity identified in the account data with an entity identified in the database. The preprocessing includes distinguishing an entity for which the account data identifies a name from an entity for which the database identifies the same name, when the two entities are different entities. The security risks associated with the entities are evaluated based on the digital assets mapped to the respective entities. The information from the account data of the service provider is merged with account data of another source.

The occurrence of events is determined based on changes in the mappings. At least one of the events includes creation of a new static assignment or allocation by the service provider. At least one of the events includes updating of an existing static assignment or allocation by the service provider. At least one of the events includes removal of a CIDR or a set of CIDRs by the service provider. At least one of the events includes provisioning of or renewal of a DHCP lease for a customer. At least one of the events includes creation or removal of announcements by the service provider related to CIDRs were a set of CIDRs. As least one of the events includes creation, updating, or removal of IMSI information. At least one of the events includes creation, updating, or removal of e-mail addresses. At least one of the events includes creation, updating, or termination of the customer in the account data.

The account data is received through an exposed API. The account data is received at regular intervals as character delimited files. The account data is received as a snapshot of an entire database maintained by the service provider. The account data is received as deltas relative to the entire database snapshot.

In general, in an aspect, customer account data is maintained that is representative of relationships that exist at successive times between digital assets provided by a service provider and respective entities to whom the digital assets are provided by the service provider. The customer account data is made available through the Internet to another party for use in updating a database to represent mappings of digital assets to respective entities as of each of the successive times.

Implementations may include one or a combination of any two or more of the following features. The digital assets provided by the service provider include digital asset identifiers of digital assets provided by the service provider as of each of the successive times. The digital asset identifiers include IP addresses or domain names or both or other digital asset identifiers. The customer account data is expressed in a predetermined format. The relationships include vendor-customer relationships between the service provider and the entities with respect to the digital assets. The customer account data is made available to a party other than the service provider. The service provider internally receives the data and updates its mapping database. The account data includes identifiers of the entities. The account data includes information about the digital assets. The account data includes a dataset of a database of the service provider. The account data is preprocessed. The preprocessing includes matching an entity identified in the account data with an entity identified in the database. The preprocessing includes distinguishing an entity for which the account data identifies a name from an entity for which the database identifies the same name, even though the two entities are different entities. The security risks associated with the entities are evaluated based on the digital assets mapped to the respective entities. The information from the account data of the service provider is merged with account data of another source. Events are determined based on changes in the mappings. The account data is made available at regular intervals as character delimited files. The account data is made available as a snapshot of an entire database maintained by the service provider. The account data is made available as deltas relative to the entire database snapshot.

These and other aspects, features, and advantages can be expressed as methods, systems, components, apparatus, program products, methods of doing business, means and steps for performing functions, and in other ways.

These and other aspects, features, and advantages will become apparent from the following description and from the claims.

DESCRIPTION

Figure 1:
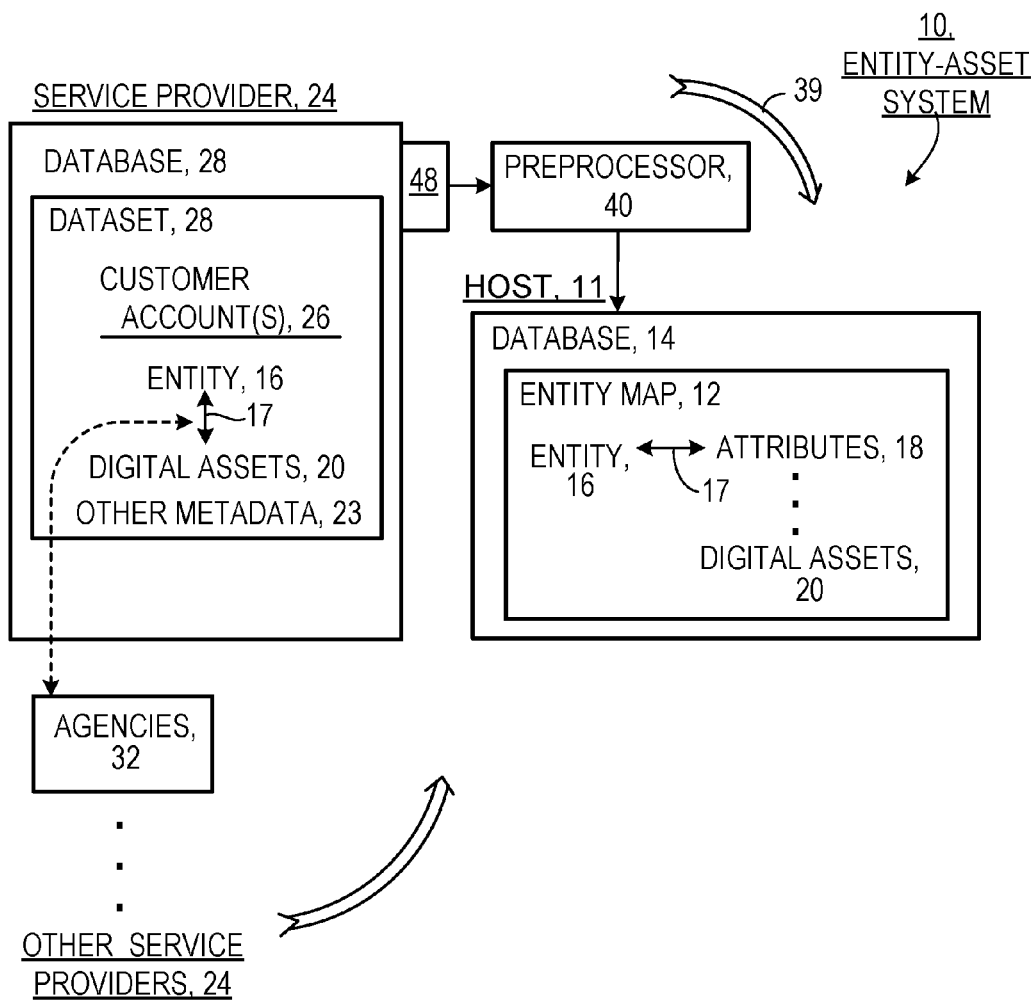
FIGS. 1 and 2 are block diagrams.

Here we describe systems and techniques (which we sometimes refer to simply as the entity-asset system) for acquiring directly or indirectly from service providers (for example, Internet service providers) and using information that is owned, controlled, or managed by the service providers and that associates digital assets (such as IP addresses and domain names and others) provided by the service providers with entities (e.g., customers of the service providers) to whom the digital assets are provided. The information that associates the digital assets with the entities may be held by, or on behalf of, the service providers in the form of account information for the customers of the service providers.

Among other things, the information that is acquired from the service providers can be useful to enhance the content, accuracy, depth, breadth, and usefulness of entity maps that are stored as part of databases, for example, by entities that generate ratings about and deliver cyber security risk information.

We use the term "service provider" broadly to include, for example, any kind of provider of a service on a network such as a public network like the Internet, for example, Internet service providers (ISPs). The service could include Internet service, and the service can be associated with digital assets such as IP addresses or domain names that are assigned to customers of the service provider and relate to the service. Service providers include Internet-related service providers who are not only direct providers of Internet service. We use the term "Internet-related service providers" broadly to include, for example, providers who offer Internet-related services in addition to or separate from Internet service itself. Such providers include cloud service providers that lease virtual machines in their clouds and thus are providing not only Internet access to their virtual machines, but also may be provisioning the virtual machines for their customers as well. Other examples of Internet-related service providers include e-mail service providers and mobile carriers. The former provide Internet-related services (e.g., e-mail addresses), while the latter provide not only Internet service but also telephone capabilities and possibly a physical device (e.g., mobile phones). Those physical devices could also access the Internet in various ways and therefore enable unifying possible datasets of the kind discussed later. The general mechanics of data collection, mapping, and use in the entity asset system for Internet service providers would be applicable to Internet-related service providers and other service providers, and the kinds of possible digital assets covered would be broader and the number larger.

We use the term "digital asset identifier" broadly to include, for example, any kind of identifier that, for example, uniquely identifies a digital asset. In some cases, digital asset identifiers are associated with customers of service providers and the associations are maintained as part of account data.

We use the term "customer" broadly to include, for example, any entity that receives any kind of service (such as Internet service) from a service provider. Any entity that receives Internet-related services from an ISP would be such a customer. In many cases, the customer will have an account with an ISP related to the provision of the service.

We use the term "account data" broadly to include any kind of data that is associated with or useful in the maintenance of an account for a customer of a service provider. In many cases, the account data will be maintained, owned, and controlled by the service provider itself, but we use the term "account data" broadly to include account data held by, maintained by, owned by, or controlled by parties other than (but on behalf of) the service provider with respect to the account. Also, we use the term "account data" broadly to include any of the kinds of data that we discuss here and that are associated with customers, whether the customers have formal accounts with the service providers. Typically the account data includes information identifying the customers and digital asset identifiers associated with the customers.

We use the term "dataset" broadly to include, for example, any body of data that relates to multiple customers, or multiple entities, such as the body of data (such as a database) that a particular ISP may maintain with respect to its customers, among other examples.

We use the term "entity map" broadly to include, for example, any body of data in which digital assets of an entity are associated with (we sometimes say "mapped to") the entity. In many cases, the body of data can be part of a database, such as a graph database, and it is possible to query the database using an identification of the digital assets in order to determine the entity that owns, controls, or manages the digital asset. Conversely it is possible to query the database using an identifier of the entity in order to determine the digital assets under its ownership, control, or management. The entity map may be maintained by a service provider, a party acting on behalf of a service provider, a party engaged in the business of rating and distributing ratings of security risks of entities, or other parties.

We use the term "entity" (which we sometimes use interchangeably with the terms "company", "business", and "organization)" broadly to include, for example, any individual, organized group of people, business, company, organization, partnership, or venture, to name a few. In many cases, the entity is one that has an online presence that customers, for example, of the entity-asset system are interested in distinguishing one from the other and to receive reports (such as cyber security risk reports) about. In some implementations, two or more of the entities can be combined, or linked, as part of a relationship tree to form logical connections. Additional information about the formation of such logical connections is set forth in U.S. patent application Ser. No. 14/021,585, filed Feb. 16, 2016. The following examples suggest the great diversity of what could be considered as distinct entities: a Fortune 500 company, a small brick and mortar store, a town, city, county, country, or other governmental organization, a charity, a non-profit organization, a hobbyist group, a university, a university department, an individual fraternity or sorority chapter at a university, or a conference operator, to name a few.

We use the term "digital asset" broadly to include, for example, any digital device, feature, capability, platform, service, domain name, IP address, IMEI, IMSI, layer 2 MAC address, phone number, e-mail address, or other asset or physical device that can access digital networks or other representation of an attribute or object of a service on a digital network, to name a few. Some examples of digital assets are included in our discussion below.

The service provider's asset management system can be operated, maintained, and made accessible by a variety of different parties, such as the service provider, a party acting on behalf of a service provider, or a party engaged in the business of rating and distributing ratings of security risks of entities, or other parties, for example. The party that operates or maintains the service provider's asset management system may use it internally or may give access to it to other parties, in some cases for a price.

Implementations of the entity-asset system can be used to merge datasets from various service providers (e.g., Internet service providers or Internet-related service providers) with one another and with datasets originating from other systems (BGP (Border Gateway Protocol) advertisements and records from the RIRs (Regional Internet Registries), for example) to form or enhance comprehensive entity maps.

As shown in FIG. 1, in implementations of the entity-asset system 10 created, maintained, or operated by a host 11, an entity map 12 is stored as part of a database 14. Within the database, each of a set of entities 16 is associated with (we sometimes say "mapped to") a respective set of attributes 18 (which we sometimes call "metadata") that describe or relate to the entity.

The attributes or metadata for an entity may include one or more of the following, although not all attributes are required to be populated for a given entity (for example, an entity might not sell a product or service): an identifier of the entity, the identifier being unique within the database even though the information about the entities come from different sources (the unique identifier for an entity may be assigned, for example, by the system); an official name of the entity; the colloquial name of the entity; a business description of the entity; a logo or primary brand of the entity; a primary operating website (e.g., URL) of the entity; a number of employees of the entity; a stock symbol of the entity; annual revenue of the entity; an industry and industry sector to which the entity belongs; and third party identifiers (e.g., Dun and Bradstreet number, LinkedIn identifier, Facebook identifier, etc.)

Attributes or metadata that represent digital assets 19 of the entity can include the following: IP addresses, domains, IMEIs, IMSIs, e-mail addresses, layer 2 MAC addresses, and phone number, among others.

We sometimes refer to the attributes or metadata of an entity, including its digital asset attributes, as an entity profile (or a company profile, interchangeably). Thus, a company profile comprises its metadata, including its digital asset metadata.

Figure 2:
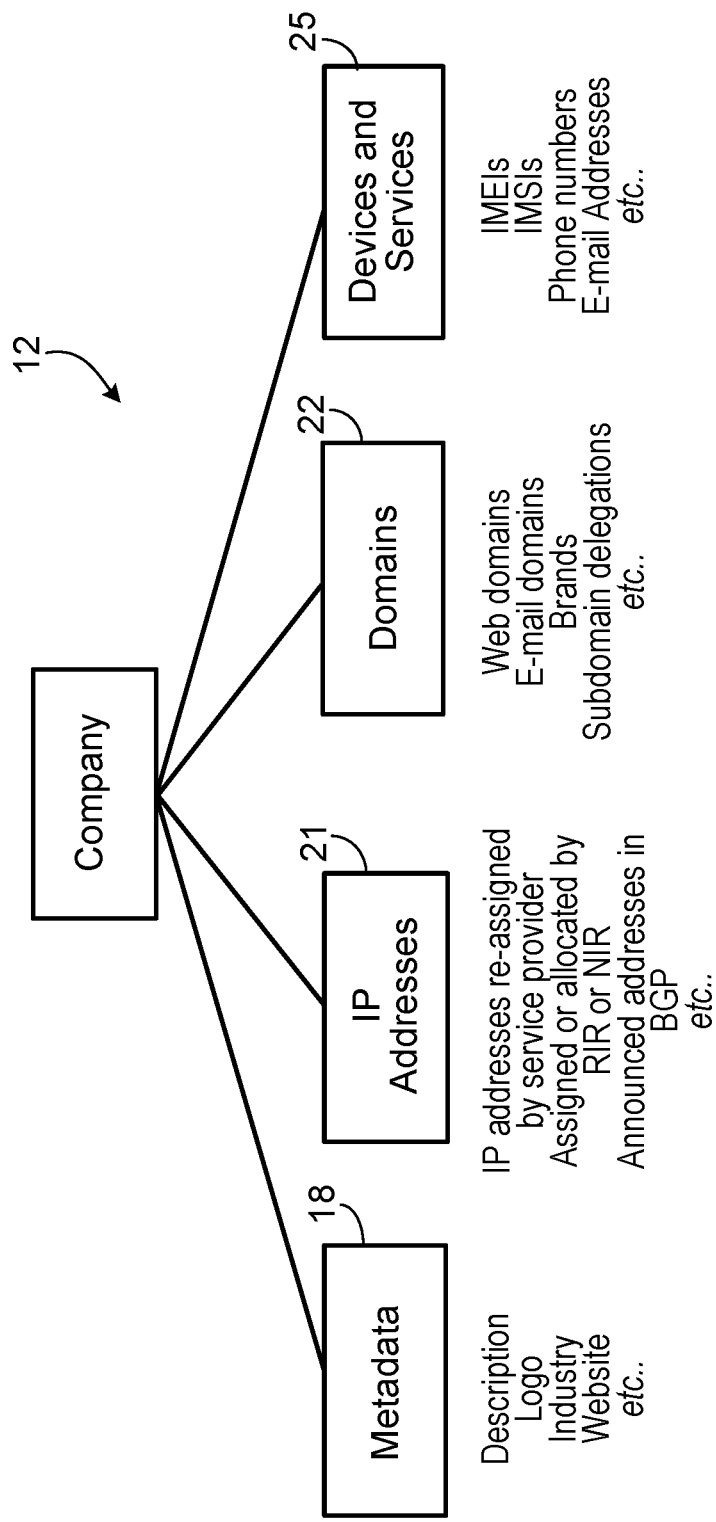

As shown in FIG. 2, in some implementations, the entity map metadata (or simply the entity map 12) for an entity comprises the metadata 18 listed above, for example; information about the digital assets 20 of the entity including IP addresses 21 that the entity has registered for or uses or both (including IP addresses reassigned by a service provider, IP addresses assigned or allocated by an RIR or an NIR (National Internet Registry), and IP addresses announced in BGP); the domains 22 (including web domains, email domains, brands, subdomain delegations, and others) the entity has registered for or uses or both, and the devices and services used by the entity 25 (including IMEIs, IMSIs, phone numbers, and email addresses, for example).

A variety of known techniques can be used to discover and accumulate the metadata for an entity. See, for example, the United States patent applications incorporated by reference in the first paragraph of this application. As we explain below, some of the metadata including entity and digital asset information may be derived from service provider customer accounts 26 or datasets 28 of the service providers, among other things.

The relationships 17 of some kinds of digital assets to corresponding entities is determined by, for example, centralized or official or informal agencies of the Internet. We use the terms "assigned" and "allocated" according to their common meanings as, for example, privileges provided by a higher authority (e.g., an Internet authority) to an entity. See, for example, *ARIN's Number Resource Manual*. We use the term "reassigned" to refer to the subsequent assignment to another entity by an authority to which an allocation has been previously made. The same relationship applies to "reallocate" but the asset is allocated by the authority to another entity rather than assigned. In some cases, an asset may be broken up into smaller asset blocks (For example, in the case of Classless Inter-Domain Routing or CIDR) that can be individually reassigned or reallocated. The respective terms follow the similar definitions and restrictions as for "assigned" and "allocated".

Service Provider Information

Because of the complexity of how IP addresses are associated with various entities, information about relationships of the IP addresses to the entities can be both difficult to accumulate and very useful. Many "tiers" of service providers operate as businesses that offer (as a service) access to the Internet, for example, to other businesses or consumers or both. A given service provider may provide its Internet access service exclusively to one type of customer.

A higher tier service provider traditionally offers only upstream Internet service to other service providers, or to businesses that have very high downstream or upstream requirements due to the nature of their businesses. Tier 1 service providers are considered the backbone of the Internet, and they have access to all parts of the Internet without having to pay other providers an upstream cost. Tier 2 service providers derive their access from Tier 1, and Tier 3 providers from Tier 2.

A customer may acquire Internet access from a service provider operating at any Tier level, if the service provider is willing to provide the service to the customer, although the willingness of the two parties to engage in such a transaction typically depends on the price. A business that's likely to acquire service from a Tier 1 provider will also be more likely to have acquired access from multiple service providers simultaneously. Consumers and residential networks are often left being able to use only the lowest-tier service provider in a geographical area.

A business customer using a Tier 1 provider is likely to be responsible for acquiring needed IP allocations or assignments from a local registrar, and the Tier 1 service provider will route those announced subnets on behalf of the customer respectively to its peers.

On the other hand, a larger proportion of the customers who use a Tier 3 provider are more likely to be assigned a dynamic IP address (i.e., an IP address that may change) both because the Tier 3 provider has fewer IPs to statically assign and has lower bandwidth capacity. Thus, a Tier 3 provider may be ill-suited for medium to large-sized businesses who also might be interested in a larger assignment.

Much as larger bandwidth requirements lead to higher costs for service, reassigning static addresses from the provider to the customer also often costs more. Because some service providers do not have the ability to reassign static addresses, or can only do so for limited numbers of static addresses, they will sometimes not represent it in their offerings.

As discussed earlier, service providers can offer their services to many types of businesses, companies, organizations, consumers and other entities. The service provider's defined product packages may limit the types of organizations that can sign-up for the respective packages. Other limitations such as physical location also may restrict the opportunities available for a potential customer. The service provider may investigate a potential customer to ensure it qualifies for a given package or offering.

Typically the relationships between service providers and customers are governed by standardized service contracts. As part of the service contract, and based on its needs, the customer may use dynamically assigned IP addresses, request static IP addresses from the service provider, or apply directly to a RIR for an allocation or assignment. If the latter occurs, the service provider does not need to maintain the metadata associated with those records (such as organization information and contact information), but the service provider has the additional burden of ensuring that its networks are appropriately announcing the customer's IP addresses.

If the customer obtains the IP addresses statically from the service provider, the service provider needs to associate this assignment to the customer through some mechanism that prevents another customer being assigned the same or any subset of those IP addresses in the future, until at least the organization is no longer a customer or requests a larger or smaller assignment. And, if the customer organization chooses to use a dynamically assigned address, the service provider also needs to track that the addresses in use so that the service provider does not redistribute the same address to another customer.

Customers for services may also use a mix of all three types of IP address arrangements with respect to a single service provider, or spread the three types of arrangements across multiple service providers.

For example, "Customer A" may have a /27 assigned to it from the RIR for the customer's servers at a co-located data center whose Internet service is provided through one particular ISP. The same "Customer A", may have another service contract at a different, or the same, ISP for Customer A's office network that is at a different physical location whose IP addresses are statically assigned directly by the ISP. "Customer A" may also have remote offices in two different states, and have another service contract from the same ISP covering a single /32 dynamically assigned for each office. In this example, "Customer A" has used all three types of IP assignment and allocation methods mentioned earlier from the same ISP. The customer may also have simultaneous contracts with other service providers to provide network connectivity to the same location, perhaps for redundancy purposes. If the customer opted to obtain IP addresses from the RIR, the customer has the opportunity to have any number of service providers announce these IP addresses on their networks ("multi-homing").

The discussion above explains nuances associated with Internet service providers. Similar and other nuances may apply when the service providers are Internet-related service providers. For example, for cloud service providers similar nuances may apply but with only individual IP addresses.

We now discuss some of the detail of these three types of IP assignments and allocations, and associative information for the assignments and allocations.

Customer Information

As implied by the discussion above, a service provider will have different (and large) amounts of metadata 23 for different organizations (entities) that are its customers.

Different customers may have different levels of business information. In addition, the points of contact or series of points of contact will be specific to the particular customer, of course. A point of contact may directly represent the customer organization as an employee, or be a contractor hired by the company, or be part of a consulting company that manages IT-related services for the company. The relationship that this individual has to the customer organization may affect how the service provider categorizes the point of contact information, and will play a more important role in how the system that we are describing consumes and uses the point of contact information, as discussed below.

In some implementations, the service provider may have the following information (metadata) for a customer that the system we are describing can interpret: identifying information; organization name; physical address(es) where service is provided; billing address; contract customer signatory including name, title, phone, and email address; abuse contact information; including name, title, phone, and email address; equipment; installation site(s) details; terminating modem or gateway model information; service provider or customer provided; headend operating mode; and service contract type.

In the case of Internet service providers, the service provider database or dataset or accounts of other data will often also include site information for each customer. In the example, "Customer A" had multiple sites, including a data center, a home office, and two remote offices whose service was provided by a single service provider. Thus, the service provider database needs to maintain a context identifying the site with which each digital asset is associated. If the two remote offices are using dynamically assigned IP addressing, the service provider would need to know that "Office A" is the one that has its lease renewed and that "Office B" had a different IP address assigned to it a couple days later. Without this information, the quality of data maintained by the service provider is lower particularly with dynamically assigned addresses. The entity-asset system would not necessarily know whether a prior lease was actually still in use. Site information could be simplistic, for example, a unique identifier, or could also contain additional metadata such as its physical location.

When data or a dataset that contains information about customers of the service provider is ingested 39 into the entity-asset system, an initial important activity (part of what the preprocessor 40 does) is to match the entity that is the customer of the service provider with an entity that is already part of the database of our system, or to add a new one if no matches found.

One challenge during the ingestion process, in particular, is to be able to distinguish a company that has a common name from another company that may use the same name. Combinations of values of attributes of the customer company (such as the domain of the customer's signatory email address) can be cross-referenced with attribute values of other datasets used in the entity-mapping process. The result of the cross-referencing process could be a merging of the incoming customer information with attributes of an existing entity in the system's database, or the creating of a new entity in the system, if it has been determined to be an unmapped organization.

In our example, if the domain of the customer's signatory email address is not sufficient, is not available, or is deemed unreliable, other unique sets of attributes (and combinations of them) of the customer data can be used instead, such as: domain of abuse contact information email address, organization name and physical address, organization name and phone number of abuse contact information, physical address and billing address, organization name and abuse contact name, or organization name and contract customer signatory name, among other combinations.

Thus, one, or many, of these attributes can be used to match incoming information with an existing entity within the entity-asset system.

The cross-referencing possibilities also depend on the kinds of information each service provider might have for a customer (e.g., one service provider might retain additional contact information or auxiliary information about the installation site that can be used for identification purposes, while others might not). Some information might also be present, but of identifiably low quality. The entity-asset has programmatic methods to identify this issue.

For example, if the domain of the customer's signatory email address is "gmail.com", the entity-asset system will know this domain is used for shared e-mail services and thus cannot be used to identify a company. In this circumstance, the entity-asset system will determine that this email address is unreliable for its purposes. Similarly, the abuse contact information email address might be an email address that the service provider setup for the customer (such that it's the domain of a service provider itself), and also could not be used for identification purposes.

If the system determines, based on the incoming data for a customer of the service provider, that the entity is unknown, the entity would then be created in the database of the system by retaining all incoming data from the service provider in combination with other information that may be discovered during the entity mapping process using the service provider data as a source.

The order in which the entity-asset system will evaluate each set of incoming customer data before making a conclusive decision about the entities with which it is associated can be different for each service provider. Some customer data may be excluded for one service provider while included for another.

The way in which customer information is handled for Internet-related service providers can be similar to the description above.

Assignments and allocations

The previous section discussed information the service provider retained about a customer that could be used to identify the customer as a "real world" business, company, or organization, and therefore to be associated with information about the entity that is part of an existing entity-asset database (or to be added as a new entry in the database).

Here we discuss the kinds of digital assets that the service provider might have provided (or given access, or delivered as a service, for example) to the customer company, including the possible auxiliary data that the service provider could have that the entity-asset system could consume.

In the case of Internet service providers, these items of information are part of the attributes and metadata to which we have referred above: RIR assigned or allocated IPv4 and IPv6 announcements; CIDR; start of announcement; service provider static IPv4 and IPv6 assignments; start of assignment; service provider dynamic IPv4 assignments; leased IP address; lease start; lease duration; set of requested options; assigned options and values (includes but is not limited to router (next hop), resolving name server(s), time server(s), domain name, domain search, and all other options as defined by RFC 2132); requesting device L2 address; client identifier; hostname; service provider dynamic IPv6 assignments; WAN IP address; prefix delegation; lease start; lease duration; set of requested options; assigned options and values (RFC 2132 plus the additional DHCPv6 RFCs); requesting device L2 address; client identifier; and host name; among others. In the case of Internet-related service providers, the information could include IMEIs, device types, device manufacturers, IMSIs, starts of contracts, ends of contracts, phone numbers, e-mail addresses, device attributes, and configurations.

As mentioned in an earlier example, the service provider might be announcing IP addresses assigned or allocated by the RIR on behalf of the customer. The entity-asset system can use that information taking account that the RIR allocation or assignment may or may not be registered directly to the customer. For example, it might be registered to a subsidiary or a business partner.

IPv4

The classes of Internet addresses assigned by the service provider for IPv4 addresses may be either statically assigned or dynamically assigned. If addresses are statically assigned, the service provider and customer negotiate how many addresses are provided. For example, if the customer wanted 32 static IP addresses, the service provider might give the customer a single /27, or give the customer two non-contiguous /28s, or four non-contiguous /29s, etc. A dynamically assigned IPv4 address will be a single /32.

IPv6

For IPv6, dynamic and statically assigned addresses from the service provider are similar to the IPv4 address assignments, but for IPv6 the units are typically referenced in /64 subnets, which is in practice the minimum sized subnet for a LAN network. A given /64 subnet has 18,446,744,073, 709,551,616 unique possible addresses. When requesting IPv6 static assignments from the RIR, it's common practice to assign either a /56 (256 distinct LANs) or a /48 (65,535 distinct LANs), while allocations by an RIR are typically a /32 IPv6 network.

Subnets that are statically assigned by the service provider will vary in number much as the number of statically assigned addresses is determined for IPv4 assignments, that is, as a conversation between the customer and the service provider. Dynamically assigned subnets and addresses represent the most significant difference between IPv4 and IPv6. With IPv6, a /128 (a single IPv6 address) is assigned to the WAN interface of the gateway (the next hop to the customer from the service provider's perspective), but the service provider also might provide a prefix delegation to the gateway if the gateway requests one. This delegation would then be used inside the customer's network for addressing accordingly. The prefix delegation size is typically fixed for dynamically assigned subnets for all customers. The size has generally been between observed to be between a /64 and a /56.

Methods

As discussed earlier, the service provider typically has systems in place to (a) track and manage their contracts with their customers, including relevant contact information and (b) track the assets assigned by the service provider to the customer for the purposes of fulfilling the service provider's contract and, in some cases, providing Internet connectivity.

While the implementation of those systems may be outside the scope of the entity-asset system, the entity-asset system is dependent on the service provider systems having their information available in a digital form that the entity-asset system can consume.

Interfaces

The entity-asset system (including the preprocessor 40) can accommodate a variety of explicit interfaces 48 with which the service provider makes its dataset available, and an implementation for each interface can be developed such that the entity-asset system can work with each service provider in a format accepted by both of them.

For example, in some implementations, a service provider could make the dataset available through an exposed API that allows an external system (such as the entity-asset system) only to perform queries on the service provider's database, or another that delivers a stream of live updates in JSON form. A service provider could publish one or multiple CSV files at regular intervals that includes their database's current state. A service provider could use a combination of approaches. For example a service provider could provide the entire database state as a bulk update, and provide deltas from that state moving forward. More generally, a variety of approaches, systems, and methods can be used to ingest (and if necessary, translate) the data in the dataset of the service providers from the formats used by the different data providers into a common dataset that the entity-asset system will consume. These intermediary systems used to ingest and translate are the preprocessors 40.

As the data in the dataset of the service provider changes, there are many changes that the entity-asset system will track and catalog.

The entity map 12 maintained by the entity-asset system 10 therefore represents a time series of data at successive time intervals. The data represents the assets associated with the customer company not only at the current time, but also at any time in the past. In addition, some service providers may have readily available historical information for a customer that can be imported into the system.

Events

Changes in data of the dataset of the service provider can be conceived as representing events that may be of interest to the entity-asset system. An event may be thought of as an abstraction that represents a change in the service provider dataset that the system may be interested in consuming. When the entity-asset system is interested in consuming a given event, the entity-asset system makes appropriate changes to the data records for the appropriate entities in the entity map that is maintained by the entity-asset system and is part of the database.

Among the events that may be of interest to the entity-asset system (and the dataset information associated with the event) are the following:

Static Assignment or Allocation

Created—In the case of service providers offering Internet connectivity services, a new static assignment or allocation by the service provider is created for a particular customer. The dataset would contain the CIDR or CIDRs assigned to the customer. The dataset also would contain the customer reference and should contain the site reference.

Updated—In the case of service providers offering Internet connectivity services, an existing static assignment or allocation by the service provider is updated for a particular customer. The dataset would contain the CIDR or CIDRs affected. The dataset would contain the customer reference and should contain the site reference. This event should only be used when a site is updated for a particular set of CIDRs.

Removed—In the case of service providers offering Internet connectivity services, a CIDR or set of CIDRs that were previously assigned or allocated to a customer by a service provider have been removed for use by the customer. The dataset would contain the CIDR or CIDRs affected. The dataset would contain the customer reference and should contain the site reference.

Dynamic Assignment

Created—In the case of service providers offering Internet connectivity services, a new DHCP lease is provisioned or renewed for a particular customer. The dataset would contain the /32 leased for IPv4 or the /128 leased for IPv6. The dataset would contain the prefix designation if requested by the customer for IPv6; the lease duration; the customer reference; and the site reference. Note that the dynamic assignment event does not have a corresponding removed subtype since leases are rarely revoked. Instead, a new DHCP lease event would be created (to indicate that the IP address has been renewed, or a new IP address provisioned), and the entity-asset system will assume the latest lease is always the most up to date for a given customer and site.

Announcement

Created—In the case of service providers offering Internet connectivity services, the service provider begins announcing a CIDR or CIDR(s) on behalf of the customer. The dataset would contain the CIDR or CIDRs that are now being announced; the customer reference; and should contain the site reference to which the CIDRs are being routed.

Removed—In the case of service providers offering Internet connectivity services, the service provider is no longer announcing a CIDR or CIDR(s) on behalf of the customer. The dataset would contain the CIDR or CIDRs that are no longer being announced; the customer reference; and should contain the site reference for which the CIDRs were previously being routed.

Service Asset

In the case of Internet-related service providers, the following events may be of interest.

Created—The service provider provisions an asset to the customer that is required for execution or usability of the service. The dataset would contain the asset being assigned to the user; the customer reference; and auxiliary information or metadata the asset requires or depends upon. For example, when an IMEI is "provisioned" to a customer account, it might be specific to one of the customer's IMSIs, and thus also must be included as part of the event. In the case of a cloud service provider, a new leased virtual machine asset would include multiple pieces of metadata including an IP address of a leased virtual machine, machine identifiers, instance types, and configurations.

Updated—An existing asset has undergone a modification by the service provider initiated by the customer or the service provider itself. The dataset would contain the asset being modified; the customer reference; and the specific changes that the asset has undergone.

Removed—The service provider is no longer offering the asset as a service to the customer. The dataset would contain the asset no longer available for use by the customer in the context of the service provider products; and the customer reference Customer Information about a customer has been updated, a new customer has been created, or an existing customer has terminated its contract. Information could include but not be limited to site information, point of contact information, physical address information, status, service plans, etc.

The entity-asset system will receive these events either directly (or indirectly) from the service provider or the preprocessor system. More commonly, the preprocessor will ingest the service provider information, interpret the dataset, and produce the respective events. Consuming a given event might cause the entity-asset system to perform more than one action, such as conducting a query to learn more about an update.

Some service providers might not make enough information available to feasibly account for all event types or perhaps do not have the capabilities that would allow such an event to occur. For example, if an Internet service provider would never announce customer IP addresses acquired from an RIR, then the system would not see any "Created Announcement" or "Removed Announcement" events from this service provider or the pre-processor ingesting this information. Alternatively, a service provider that does not offer Internet service to its customers would not generate a "Static Assignment" or "Dynamic Assignment" event, or other related events.

Each event should have an associated customer and site reference. If the entity-asset system is not aware of the service provider specific customer reference, the entity-asset system can query the service provider system or a preprocessor to acquire the relevant customer metadata. The entity-asset system will have to make a decision how to import the customer information into the system by either (a) merging it with an existing entity in the system, or (b) creating a new entity in the system. The logic for determining which to do was discussed earlier.

Figure 3:
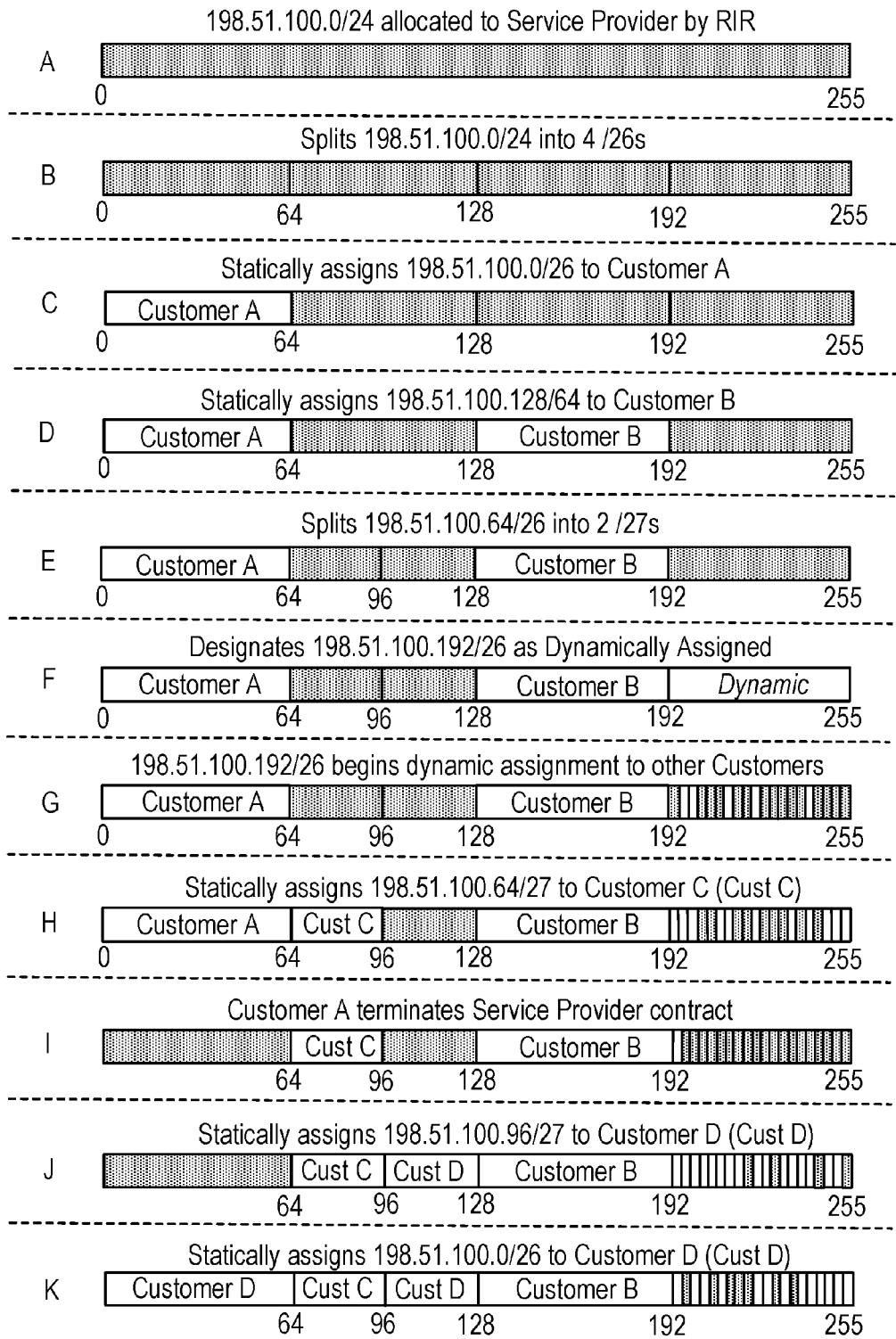
FIG. 3 is a schematic view of a time sequence.

FIG. 3 shows a condensed time-series example of how an Internet service provider might manage a specific IPv4 /24 (256 IPs) allocated to it from an RIR and the corresponding information that the entity-asset system would consume and interpret. Each letter in the left column of FIG. 3 represents a state; it can be assumed that any amount of time has passed between the previous state or the next state; The amount of time between states is irrelevant for the operations of the entity-asset system, although maybe important for how the information will be used by other systems (e.g., it can be one hour, or one year, and the entity-asset system will know the delta when it's notified of the state change and will note that accordingly). Not all event types are represented in the example. In FIG. 3, blocks in gray represent IPs not in active use by a customer.

This time-series begins at 'A', which is when an Regional Internet Registry (RIR) allocated 198.51.100.0/24 to this service provider. The RIR will update its local records to indicate that this /24 has been allocated, to whom, when, as well as other metadata. This information is then made accessible to outside parties through the WHOIS protocol or the RIR's website, perhaps through an API if available. No other party should be using this IP space. No event would be represented or interpreted by the entity-asset system for this action.

At state 'B', the service provider decided to split the /24 into four distinct /26s each of 64 IP addresses. The service provider could have done this for planning purposes or in anticipation of customer requests. Note that in this example, the service provider might not be announcing these IPs to any of its peers yet, nor is it being used by any customer, so the "split" of the /24 is purely the entity conceptual and would not change the behavior of other systems not using this IP space. No event would be represented or interpreted by this system for this action.

With state 'C', the service provider assigns the first /26, 198.51.100.0/26, to Customer A (64 IP addresses). The service provider also begins to announce the entire /24 to its upstream providers as well as any organization for which it has a peer relationship. Customer A's statically assigned IP space is now routed to the rest of the Internet and no other organization should be using this IP space. Customer A's computer systems might not actually be connected yet, but its assignment is now routed on the Internet. This should be represented by the entity-asset system as a "Static Assignment or Allocation" event.

In state 'D', Customer B becomes a new subscriber and also has 198.51.100.128/26 allocated to it (64 IP addresses). As mentioned in the previous example, Customer B's IP space was already being announced to the service provider's peers (since the summary CIDR is the /24) and upstream provider, but it was not being used. This occurrence should be represented as a "Static Assignment or Allocation" event.

For the transition to state 'E', the service provider decided to split 198.51.100.64/26 into two /27s, perhaps in preparation for a new customer. Considering there was no customer using this /26, there was no effect to any of the service provider's customers. No event would be represented or interpreted by the entity-asset system for this action.

At state 'F', the service provider designated 198.51.100.192/26 to be used for dynamic assignments for its customers that did not need statically assigned IP addresses. IP addresses are assigned using the DHCP protocol for IPv4 addresses.

With state 'G', the first customers begin receiving dynamic assignments when their routing infrastructure comes online. Note that the small dividers within 198.51.100.192/26 are meant to represent individual /32s (single IP addresses), even though there are not 64 distinct blocks to represent the total IP addresses available in the /26. Each new or renewed lease would be construed as an individual "Dynamic Assignment" event.

In state 'H', another customer, Customer C, has become a client of the service provider and has been statically assigned 198.51.100.64/27. Also note that there have been additional /32s assigned to other customers within the dynamic assignment mentioned in state 'G'. This should be represented by the entity-asset system as a "Static Assignment or Allocation" event for the addition of the static CIDR, and as additional "Dynamic Assignment" events for each of the dynamic assignments.

With state 'I' Customer A has terminated its contract with the service provider and has forfeited its assigned IP space back to the service provider. While this space is still announced to the server provider's peers and upstream provider, the service provider has physically terminated the connection to Customer A such that it no longer has service. The service provider would also update its systems to indicate that Customer A is no longer using 198.51.100.0/26 to which it was previously assigned. This should be represented by the entity-asset system as a "Static Assignment or Allocation" event. Also note that in state 'I', there are additional /32s assigned to customers within the dynamic assignment IP block, but also that /32s that were previously being used are no longer assigned to anyone. This could occur for a number of reasons, including but not limited to (a) the customer previously using the /32 is no longer a customer; or (b) the customer's equipment power-cycled and lost the dynamic lease and the service provider simply assigned it a new IP address; or (c) the customer's equipment is powered off or has lost the lease and has not yet requested a new one. Each new or renewed lease would be construed as an individual "Dynamic Assignment" event. The ones no longer used would be expired due to these assignments having fixed duration.

In state 'J', a new customer, Customer D, has been assigned 198.51.100.96/27. This should be represented by the entity-asset system as a "Static Assignment or Allocation" event.

After realizing the original /27 assignment was not enough, Customer D requested additional IP space, which was granted by the service provider who also assigned 198.51.100.0/26 to Customer D in state 'K'. Note that 198.51.100.192/26 has fewer assignments than the previous state 'J'. These can be due to the same reasons as stated with respect to state 'I'. This should be represented as a "Static Assignment or Allocation" event. This in addition might also be represented as a "Customer" event if a new site was brought online in the process.

The entity-asset system that we have described provides technological benefits to, for example, the technology of accumulating and evaluating the cyber security risks associated with the digital assets of an entity and of reporting those risks to interested parties. The technology of accumulating and evaluating cyber-security risks associated with digital assets can involve, for example, sensing activities on the Internet, for example, and accumulating other information electronically from various sources, then melding the data at one location to evaluate the cyber-security risks. These processes cannot be performed manually or in a person's brain. The entity-digital asset system that we describe here enhances that technology and others, among other things, by establishing another mode of accumulating high-quality information by Internet communication, sometimes more than one service provider. This makes the technology that processes, analyzes, and delivers the information faster and more effective.

Other implementations are also within the scope of the following claims.

For example, although in many cases we have described how information about the customer accounts of the service provider would be obtained from the service provider and used by another party, such as a cyber security rating business, each of the activities performed by the other party and combinations of any two or more of them could also be performed by the service provider itself, either as a service for its customers or other third parties, or for its own purposes. In addition, the functions and features that we have described above can be split between one or more service providers and one or more other entities in a wide variety of ways.

The invention claimed is:

1. A computer-implemented method comprising
receiving from a service provider customer account data representative of relationships that exist at successive times between digital assets provided by the service provider and respective entities to whom the digital assets are provided by the service provider, and
using the received data to update a database to represent (a) mappings of the digital assets to respective entities to whom the digital assets are provided at one of the successive times, and (b) changes in the mappings between successive times, wherein the changes in mappings result from state-transitions of IP allocations at the service provider, and wherein the state-transitions comprise splitting an allocated IP address space into sub-spaces and allocating one or more of the sub-spaces to one of the respective entities, and
wherein the customer account data is preprocessed by selectively identifying and ordering metadata within the customer account data to facilitate one of (i) matching of the customer account data to an existing entity in the database or (ii) creation of a new entity in the database, and
deriving a cybersecurity rating for the respective entities based at least in part on the updated database.

2. The method of claim 1 in which the digital assets provided by the service provider comprise digital asset identifiers of digital assets provided by the service provider as of each of the successive times.

3. The method of claim 2 in which the digital asset identifiers comprise IP addresses or domain names or both.

4. The method of claim 1 in which the customer account data is expressed in a predetermined format and in which the method comprises preprocessing the account data in the predetermined format to generate data in a common format for use in the updating of the database.

5. The method of claim 1 in which the relationships comprise vendor-customer relationships between the service provider and the entities with respect to the digital assets.

6. The method of claim 1 in which a party other than the service provider or any of the entities receives the data and updates the database.

7. The method of claim 1 in which the service provider internally receives the data and updates the database.

8. The method of claim 1 in which the account data comprises identifiers of the entities.

9. The method of claim 1 in which the account data comprises information about the digital assets.

10. The method of claim 1 in which the account data comprises a dataset of a database of the service provider.

11. The method of claim 1 in which the preprocessing comprises distinguishing an entity for which the account data identifies a name from an entity for which the database identifies the same name, when the two entities are different entities.

12. The method of claim 1 comprising evaluating security risks associated with the entities based on the digital assets mapped to the respective entities.

13. The method of claim 1 comprising merging information from the account data of the service provider with account data of another source.

14. The method of claim 1 comprising
determining events based on changes in the mappings.

15. The method of claim 14 in which at least one of the events comprises creation of a new static assignment or allocation by the service provider.

16. The method of claim 14 in which at least one of the events comprises updating of an existing static assignment or allocation by the service provider.

17. The method of claim 14 in which at least one of the events comprises removal of a CIDRs or a set of CIDRs by the service provider.

18. The method of claim 14 in which at least one of the events comprises provisioning of or renewal of a DHCP lease for a customer.

19. The method of claim 14 in which at least one of the events comprises creation or removal of announcements by the service provider related to CIDRs were a set of CIDRs.

20. The method of claim 14 in which at least one of the events comprises creation, updating, or removal of IMSI information.

21. The method of claim 14 in which at least one of the events comprises creation, updating, or removal of email addresses.

22. The method of claim 14 in which at least one of the events comprises creation, updating, or termination of the customer in the account data.

23. The method of claim 1 in which the account data is received through an exposed API.

24. The method of claim 1 in which the account data is received at regular intervals as character delimited files.

25. The method of claim 1 in which the account data is received as a snapshot of an entire database maintained by the service provider.

26. The method of claim 25 in which the account data is received as deltas relative to the entire database snapshot.

27. A computer-implemented method comprising
maintaining customer account data representative of relationships that exist at successive times between digital assets provided by a service provider and respective entities to whom the digital assets are provided by the service provider,
making the customer account data available through the Internet to another party for use in updating a database to represent a mappings of digital assets to respective entities as of each of the successive times, and (b) changes in the mappings between successive times wherein the changes in mappings result from state-transitions of IP allocations at the service provider, and wherein the state-transitions comprise splitting an allocated IP address space into sub-spaces and allocating one or more of the sub-spaces to one of the respective entities, and
wherein the customer account data is preprocessed by selectively identifying and ordering metadata within the customer account data to facilitate one of (i) matching of the customer account data to an existing entity in the database or (ii) creation of a new entity in the database, and
deriving a cybersecurity rating for the respective entities based at least in part on the updated database.

28. The method of claim 27 in which the digital assets provided by the service provider comprise digital asset identifiers of digital assets provided by the service provider as of each of the successive times wherein the changes in the mappings are based on one or more events and wherein the identified events comprise one or more of removal of one or more CIDRs provided by the service provider, provisioning of or renewal of a DHCP lease and creation, updating, or removal of IMSI information.

* * * * *